United States Patent
Lugli et al.

(10) Patent No.: US 11,104,830 B2
(45) Date of Patent: Aug. 31, 2021

(54) PRESSURE SENSITIVE COMPOSITIONS BASED ON A MODIFIED RUBBER POLYMER AQUEOUS DISPERSION

(71) Applicant: Arkema France, Colombes (FR)

(72) Inventors: Mario Lugli, Fabbrico (IT); Umberto Amadei, Commessaggio (IT); Simona Ferretti, Sorbolo (IT); Luca Resta, San Silvestro di Curtatone (IT); Leo Mario Saija, Bagnolo IN Piano (IT)

(73) Assignee: Arkema France, Colombes (FR)

( * ) Notice: Subject to any disclaimer, the term of this patent is extended or adjusted under 35 U.S.C. 154(b) by 282 days.

(21) Appl. No.: 15/532,521

(22) PCT Filed: Dec. 2, 2015

(86) PCT No.: PCT/EP2015/078391
§ 371 (c)(1),
(2) Date: Jun. 2, 2017

(87) PCT Pub. No.: WO2016/087534
PCT Pub. Date: Jun. 9, 2016

(65) Prior Publication Data
US 2018/0037784 A1      Feb. 8, 2018

(30) Foreign Application Priority Data
Dec. 4, 2014 (EP) .................................... 14196362

(51) Int. Cl.
| | | |
|---|---|---|
| C09J 151/04 | (2006.01) | |
| C08L 51/04 | (2006.01) | |
| C08F 2/22 | (2006.01) | |
| C08F 253/00 | (2006.01) | |
| C08F 279/02 | (2006.01) | |
| C09J 7/38 | (2018.01) | |

(52) U.S. Cl.
CPC ............... *C09J 151/04* (2013.01); *C08F 2/22* (2013.01); *C08F 253/00* (2013.01); *C08F 279/02* (2013.01); *C08L 51/04* (2013.01); *C09J 7/381* (2018.01); *C09J 7/383* (2018.01); *C09J 7/385* (2018.01); *C08L 2201/50* (2013.01); *C09J 2203/00* (2013.01); *C09J 2301/414* (2020.08); *C09J 2407/00* (2013.01); *C09J 2433/00* (2013.01); *C09J 2451/00* (2013.01)

(58) Field of Classification Search
None
See application file for complete search history.

(56) References Cited

U.S. PATENT DOCUMENTS

| | | |
|---|---|---|
| 4,918,128 A | 4/1990 | Sakai |
| 5,190,818 A | 3/1993 | Sakai |
| 5,373,060 A * | 12/1994 | Guentherberg ........ C08F 285/00 525/279 |
| 5,625,005 A | 4/1997 | Mallya et al. |
| 6,383,653 B1 | 5/2002 | Vaidya |
| 6,423,783 B1 * | 7/2002 | Gilbert .................. C08F 255/06 525/302 |
| 7,232,857 B2 | 6/2007 | Hirasawa |
| 7,396,871 B2 | 7/2008 | Shoaf et al. |
| 2003/0022980 A1 | 1/2003 | Foreman et al. |
| 2004/0014885 A1 | 1/2004 | Nakajima et al. |
| 2005/0080181 A1 | 4/2005 | Hirasawa |
| 2007/0010610 A1 | 1/2007 | Kondo |
| 2010/0266837 A1 | 10/2010 | Srivatsan et al. |

FOREIGN PATENT DOCUMENTS

| | | |
|---|---|---|
| CN | 1772831 A | 5/2006 |
| JP | 2005097487 A2 | 4/2005 |

OTHER PUBLICATIONS

Machine translation of CN1772831, Lui et al. (Year: 2006).*

* cited by examiner

*Primary Examiner* — Shawn Mckinnon
(74) *Attorney, Agent, or Firm* — Lynn B Morreale

(57) ABSTRACT

The invention relates to an aqueous polymer dispersion comprising:
a) an aqueous polymer dispersion comprising grafted rubber polymeric particles from rubber polymer being selected from natural or synthetic rubber,
b) an aqueous polymer dispersion with polymeric particles of a second polymer comprising monomeric units derived front a monomeric composition b) comprising:
b1) a (meth)acrylate of a linear or branched alcohol in $C_4$ to $C_{10}$ or a mixture of such (meth)acrylates, said (meth) acrylate having $Tg_{b1}$ lower than $-30°$ C.,
b2) optionally, at least one comonomer having $Tg_{b2}$ higher than $-30°$ C.,
with said grafted rubber polymeric particles being grafted in an aqueous dispersion by a part of said monomeric composition b) as defined above. The invention covers a process of preparation of said dispersion, an adhesive composition comprising said dispersion, the use of said dispersion in pressure sensitive adhesives, and the resulting adhesive.

20 Claims, No Drawings

PRESSURE SENSITIVE COMPOSITIONS BASED ON A MODIFIED RUBBER POLYMER AQUEOUS DISPERSION

CROSS-REFERENCE TO RELATED APPLICATIONS

This application is a national stage application under 35 U.S.C. § 371 of PCT/EP2015/078391, filed Dec. 2, 2015 which claims benefit to application EP14.196362.9, filed Dec. 4, 2014.

The present invention relates to a specific polymeric aqueous dispersion, polymeric particles based on a grafted modified rubber polymer, in particular based on a modified natural rubber polymer, to a specific process of preparation, to an adhesive composition in particular PSA adhesive composition, to uses of the said polymeric aqueous dispersion in said adhesive compositions and the resulting adhesive as a final product. The aqueous polymer dispersions according to the present invention are suitable for the production of a pressure-sensitive adhesive (PSA), able to provide good adhesion to polar and non-polar surfaces while maintaining the typical soft touch of the natural rubber based adhesives.

The pressure sensitive adhesives formed with the polymeric composition of the present invention (by using said polymeric aqueous dispersion) show a further characteristic of having high cohesive strength, high creep resistance while avoiding any transfer of residual traces of the adhesives on the substrates, which means that the failure is specifically adhesive.

One of the key characteristics of the present invention is producing an hybrid polymer-based aqueous dispersion, which is a mixture of an aqueous polymer dispersion a) formed of polymeric particles of rubber polymer, in particular natural rubber polymer modified, in particular grafted with a monomeric composition comprising specific acrylic monomers and of an aqueous polymer dispersion b) formed of polymeric particles issued from the same monomeric composition as the one grafted on said rubber polymer a) and which aqueous dispersion mixture of a)+b) is stable on time of storage, has low amounts of dry coagulum, in addition to the previously cited high adhesive performances. In particular, said dispersion a) of grafted rubber polymer a) is issued directly from an aqueous dispersion (latex) of said rubber polymer by a specific process of emulsion polymerization of said monomeric composition in the presence of said aqueous rubber dispersion as raw material. The natural rubber is particularly preferred but other unsaturated synthetic rubber polymers in aqueous dispersion can also be used, more particularly copolymers of butadiene or of isoprene in an aqueous dispersion, like SBR (styrene butadiene rubber) latexes or latexes of equivalent copolymers of isoprene.

The hybrid polymeric aqueous dispersion of the present invention can be applied directly on the substrates as an adhesive composition or for a specific polymeric aqueous dispersion with the polymer bearing suitable functional groups for crosslinking, in a two components curable adhesive composition, comprising in addition to said aqueous dispersion a suitable crosslinker selected from polyisocyanates, polyaziridines or zinc oxide complex, depending on said functional groups introduced by specific functional monomers.

From the prior art, are known many attempts to produce different hybrids copolymer dispersions, between hydrocarbon oligomers or rubber and acrylic monomers but only few of them do consider rubber polymer and in particular natural rubber polymer as base polymer.

US 2010266837 and U.S. Pat. No. 5,625,005 disclose the production of an hybrid copolymer between hydrocarbon oligomers, hydrogenated polyisoprene or butylene-ethylene macromer and acrylic monomers, this in order to improve the adhesion on low surface energy substrates like polypropylene, while maintaining high level of shear and SAFT (Shear Adhesion Failure Temperature). However, there is none examplification of aqueous dispersion as in the present invention and all examples relate to solvent-based polymerization (in solution) and there is no disclosure of the use of a rubber polymer aqueous dispersion (latex), as the base polymer of the obtained hybrid polymer.

U.S. Pat. No. 7,396,871 relates to a PSA adhesive, composed of an acrylic natural rubber hybrid latex, with high shear strength above all at 50° C. and unchanged adhesion, but the waterborne hybrid polymer dispersion is produced by mini-emulsion polymerization of an organic solution of dry milled natural rubber dissolved in the acrylic monomers in order to form said pre-emulsion (solution dispersed) with the use of high energy sophisticated systems for. In example 2, it is taught that if the process is not conducted according to a mini-emulsion polymerization, due to the natural rubber precipitations, a great amount of dry coagulum is formed.

US 2007010610 discloses the preparation of an hybrid polymer, where only 0.01-5 parts of an acrylic monomer is grafted on 100 parts of natural rubber, by using organic initiators. Then, the hybrid polymer dispersion is coagulated and dried, eventually compounded with silane coupling agent and fumed silica, to be used for the production of tires.

The US 2003022980 discloses a PSA with improved adhesion on low energy substrates with high shear strength, based on hybrid polymer between acrylic monomers and preferably ethylene-butylene macromers. No use is disclosed of any rubber polymer in aqueous dispersion modified by emulsion polymerization in water for producing PSA adhesives.

U.S. 63/836,5361, U.S. Pat. Nos. 5,190,818 and 4,918,128 relate to a special class of PSA adhesives, dedicated in the production of mail paper, with cohesion properties particularly resistant to silicone oils and temperatures. These PSA adhesives are based on natural rubber polymer modified with a maximum of 40% w/w of acrylic monomers and compounded with different types of additives, like starch and fumed silica. However, there is none disclosure of a process necessary for producing these PSA and moreover the amount of acrylic monomers is in minor proportions with respect to natural rubber.

JP 2005097487 discloses the preparation of natural rubber modified with acrylic monomers, it claims the use of organic peroxides but in a static polymerization without stirring to avoid formation of dry coagulum and a max amount of 50 parts of (meth)acrylic monomers, on 100 parts of natural rubber latex on solids.

None of the cited prior art documents discloses or suggests a way to modify an acrylic PSA with a high amount of rubber polymer in aqueous dispersion by emulsion polymerisation, in particular with natural rubber from 5 to 45%, preferably from 10 to 35% on total of polymers, by using an emulsion polymerization specific process, which can be handled in a standard industrial production plant, without coagulum and storage stability problems for the obtained hybrid aqueous dispersion.

None of the cited documents suggests or teaches how to obtain an acrylic hybrid latex polymer, with synthetic or natural unsaturated rubbers, owning the PSA properties described above, produced by a simple emulsion polymerization process.

One big difficulty to be overcome with respect to known prior art, when using an unsaturated rubber polymer latex, in particular a natural rubber (NR) latex in a radical polymerization process, is that after the grafting process between acrylic monomers and the unsaturated rubber polymer, in particular NR, if the process is not well defined and controlled a crosslinking/vulcanization involving the unsaturations of the unsaturated rubber can easily take place, leading to an unstable dispersion of polymeric particles with agglomerates and flocculation and above all taking away all the adhesive properties coming from the acrylic monomers b1) by said crosslinking. The present invention including its specific dispersion and process of preparation enables preventing and limiting such an unpleasant result. IR spectra analysis and applicative properties do confirm the absence of crosslinking between rubber polymer chains.

The objective of the present invention is to obtain a PSA composition with improved cohesive strength, adhesion on low surface tension substrates for example for labelling on polypropylene (PP) and above all to have the same characteristic of soft touch for said PSA, as obtained with a standard PSA exclusively based on normal natural rubber.

In fact, a man skilled in the art already knows that rubber polymer emulsions (dispersions) and in particular natural rubber (natural latex) has a very low stability and it is easily coagulated, producing in this way high amounts of dry coagulum in a normal emulsion polymerization. Even the derived hybrid polymer dispersions usually could be affected by a very short shelf life, which prevent or limit their exploitation for a commercial use.

Moreover, during a radical polymerization process, the rubber polymer, in particular natural rubber due to the presence of multiple unsaturations per rubber polymer chain, can be heavily cross-linked by the free radicals, increasing it stiffness so much, to make impossible to use it as adhesive.

The first subject of the present invention is an aqueous polymer dispersion comprising a mixture of a) an aqueous dispersion comprising grafted rubber polymeric particles, from natural or synthetic rubber and b) an aqueous dispersion of polymeric particles of a second polymer comprising monomeric units from a monomeric composition b) comprising b1) a (meth)acrylate of linear or branched alcohol in $C_4$ to $C_{10}$ or a mixture of, having $Tg_{b1}$ lower than $-30°$ C. and optionally b2) at least one comonomer having $Tg_{b2}$ higher than $-30°$ C., with said grafted rubber polymeric particles being grafted in an aqueous dispersion by a part of said monomeric composition b) and in particular with said grafted part of monomeric composition b) on said rubber polymer a), varying from 25 to 50% w/w of the total weight of said monomeric composition b) involved in both grafted polymer a) and in polymer b).

The second subject covered by the present invention relates to a specific process for preparing the said aqueous dispersion comprising a) and b) as defined above.

It is also part of the present invention, a composition comprising the said aqueous dispersion, in particular an adhesive composition and more particularly a PSA adhesive composition.

The present invention does also cover the use of the aqueous dispersion according to the present invention, in adhesive compositions and in particular in PSA adhesive compositions.

Finally it is part of the present invention, the final product resulting from the use of an aqueous dispersion according to the present invention, which is an adhesive, in particular a PSA adhesive.

So, the first subject of the present invention is an aqueous polymer dispersion which comprises a mixture of:
a) an aqueous polymer dispersion comprising grafted rubber polymeric particles from rubber polymer being selected from natural or synthetic rubber, preferably from natural rubber,
b) an aqueous polymer dispersion with polymeric particles of a second polymer comprising monomeric units derived from a monomeric composition b) comprising:
  b1) a (meth)acrylate of a linear or branched alcohol in $C_4$ to $C_{10}$ or a mixture of such (meth)acrylates, said (meth)acrylate having $Tg_{b1}$ lower than $-30°$ C., preferably lower than $-40°$ C. and
  b2) optionally, at least one comonomer having $Tg_{b2}$ higher than $-30°$ C., preferably of $Tg_{b2}$ higher than $-10°$ C.

with said grafted rubber polymeric particles being grafted in an aqueous dispersion by a part of said monomeric composition b) as defined above and in particular with the said grafted part of monomeric composition b) on said rubber polymer a), representing from 25 to 50% w/w of the total weight of said monomeric composition b) involved in both, grafted rubber polymer a) and in polymer b).

A monomer having a given glass transition temperature (Tg) means that its homopolymer has the said Tg. Tgs of all polymers, according to the present invention, are determined by DSC with a heating rate of 20° C./min. The Tg corresponds to the temperature of the midpoint of the DSC curve, at the third passage at same heating rate.

The said rubber polymer used in a) is an unsaturated rubber and may be natural or synthetic rubber, in the form of an aqueous dispersion (latex). Natural rubber is the most preferred according to the present invention. Natural rubber may be centrifugated natural rubber, low and high ammonia, containing or not zinc oxide.

Synthetic rubber may be polyisoprene, polybutadiene or copolymers of isoprene or of butadiene in the form of latexes, in particular for copolymers it may be styrene-butadiene (SBR) latex.

According to a particular preferred option of said dispersion according to the present invention as defined above, the said rubber polymer a) is natural rubber. Consequently, the said grafted rubber polymeric particles are preferably grafted natural rubber particles in aqueous dispersion a).

However, it is possible for said rubber polymer a) to be synthetic rubber and selected from: polyisoprene, polybutadiene or their copolymers isoprene-butadiene or from other copolymers of isoprene or of butadiene. In particular, aqueous dispersions (also called latexes) of butadiene copolymers such as styrene-butadiene are well known as SBR latexes. Equivalent latexes may be considered for isoprene copolymers.

Preferably, the weight proportion or weight content of said rubber polymer a), without grafted monomers, with respect to the global weight of polymers a)+b), represents from 5 to 45% and preferably from 10 to 35%. In this consideration, the weight of grafted monomers b) is not taken into account in the weight of polymer a). In fact, this parameter in combination with the proportion of b) grafted on polymer a) enables to define initial weight ratio of rubber polymer to monomeric composition b) and the weight ratio of grafted polymer a) to polymer b). Polymer b) here is considered to be the complementary part of the monomeric composition b) grafted on polymer a).

The weight proportion of grafted rubber polymer a), comprising the grafted part of b) monomers with respect to the total of polymers a)+b) in said aqueous dispersion of the present invention may vary from 0.1 to 10%, preferably from 0.1 to 4%.

Suitable monomers according to the definition of b1) may be selected from: butyl (meth)acrylate, in particular n-butyl (meth)acrylate, more particularly n-butyl acrylate, 2-ethyl hexyl (meth)acrylate, 2-octyl (meth)acrylate, isooctyl (meth)acrylate, nonyl(meth)acrylate or decyl (meth)acrylate or a mixture of at least two or of at least three of said monomers b1) as above-defined, preferably from butyl acrylate, in particular n-butyl acrylate, 2-ethyl hexyl acrylate, 2-octyl acrylate or isooctyl acrylate, nonyl(meth)acrylate or decyl (meth)acrylate, more preferably 2-ethyl hexyl acrylate.

According to a particular embodiment of the present invention, b) comprises monomeric units derived from a comonomer b2) which can be selected from: functional and/or non-functional ethylenically unsaturated monomers, in particular with said functional monomers being selected from monomers bearing at least one carboxy ($-CO_2H$), hydroxyl ($-OH$), acetoacetoxy, amine or nitrile ($-CN$) functional groups, preferably carboxylic or hydroxyl groups and with said non-functional monomers being selected from $C_1$ to $C_6$ esters of (meth)acrylic acid, vinyl aromatic monomers, particularly styrene and esters of vinyl alcohol with $C_2$ to $C_{18}$, preferably $C_2$ to $C_{14}$ carboxylic acids.

The ethylenically unsaturated monomer(s) of composition b) as defined above can be added as a single type of monomer or as a mixture. Examples of suitable ethylenically unsaturated monomers b2) as defined above for the monomeric composition b) may include, but are not limited to, styrenic monomers such as, for example, styrene, alpha-methyl styrene, vinyl naphthalenes, vinyl toluenes, chloromethyl styrene, vinyl acetate vinyl esters of verstic acids, (meth)acrylic monomers selected from methyl acrylate, acrylic and methacrylic acid, methyl methacrylate, ethyl acrylate, ethyl methacrylate, lauryl methacrylate, lauryl acrylate, glycidyl methacrylate, allyl methacrylate, vinyl methacrylate, acetoacetoxyethyl methacrylate, acetoacetoxyethyl acrylate, acetoacetoxypropyl methacrylate, acetoacetopropryl acrylate, hydroxybutenyl methacrylate, allylic monomers from allyl or diallyl ester of maleic acid, poly(allyl glycidyl ether), alkyl crotonates, vinyl acetate, di-n-butyl maleate, di-octylmaleate, acrylonitrile, diacetoneacrylamide, acrylamide, methacrylamide, N-methylol (meth)acrylamide, hydroxyethyl methacrylate, hydroxyethyl acrylate or hydroxypropyl (meth)acrylate, nitrogen containing monomers including t-butyl aminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethylacrylate, N-(2-methacryloyloxy-ethyl) ethylene urea and methacrylamidoethylethylene urea. Methyl methacrylate and (meth)acrylic acid are preferred.

The weight content of b2) in said monomeric composition b) or in polymer b) may vary from 0 to 30% and preferably from 0.1 to 30%, more preferably from 1.5 to 20%.

According to a more particular preference, said monomeric composition b) consists of 2-ethyl hexyl acrylate and polymer b) is an homopolymer of 2-ethyl hexyl acrylate.

According to an alternative option, said monomeric composition b) may comprise 2-ethyl hexyl acrylate as monomer b1) and a comonomer b2) selected from at least one functional or non functional monomer as defined above, preferably at least one functional monomer bearing at least one carboxy ($-CO_2H$) or hydroxyl ($-OH$) functional group, with a weight content of 2-ethyl hexyl acrylate as monomer b1) with respect to said monomeric composition b) varying from 70 to 99.9%, preferably from 80 to 98.5% of said monomeric composition b) and polymer b) is a copolymer of 2-ethyl hexyl acrylate as monomer b1) with a comonomer b2) selected from: at least one functional or non functional monomer as defined above, preferably at least one functional monomer bearing at least one carboxy ($-CO_2H$) or hydroxyl ($-OH$) functional group, with a weight content of 2-ethyl hexyl acrylate as monomer b1) with respect to said polymer b) varying from 70 to 99.9%, preferably from 80 to 98.5%. According to a particular option of the present invention, the said comonomer b2) is present in said monomeric composition b) and is a functional monomer selected from a monomer bearing at least one carboxy group and/or a monomer bearing at least one hydroxyl group.

To overcome all the problems previously enounced, linked with the very low stability of the natural rubber, but also for some synthetic rubbers, a specific emulsion polymerization process is proposed for preparing the said aqueous dispersion according to the present invention.

This leads to the second subject of the present invention which relates to a process of preparing an aqueous polymer dispersion as defined above, which process comprises the following successive steps:

i) preparation of an aqueous dispersion of a polymer b) by emulsion polymerization with continuous constant rate feeding in a reactor of a pre-emulsion of monomers b) comprising b1) and optionally b2), as above-defined according to the present invention, ii) before step iii) as defined below and during said continuous feeding of said pre-emulsion, adjusting of the pH of the reactor at a value higher than 7, preferably higher than 8, by the feeding at a constant feeding rate of an aqueous solution of a basic agent, optionally with said feeding continuing up to the end of the following step iii) or by adding in a shot, an aqueous solution of said basic agent and iii) when the quantity in the reactor of the said continuously fed pre-emulsion of monomers b) represents a prefixed value being from 50 to 85%, preferably from 50 to 75% w/w of said pre-emulsion, then starting a progressive addition at constant feeding rate of an aqueous dispersion of rubber polymer a) as defined above according to present invention, with maintenance of the said continuous feeding at constant rate of the remaining pre-emulsion of monomers b), with a resulting chemical modification of said rubber polymer a) by the grafting reaction of said monomers b) on it, with the said emulsion polymerization and grafting reactions being conducted in the presence of an initiator which does not generate acidic decomposition products.

An alternative method of preparation of the aqueous hybrid polymer dispersion according to the present invention could be i) separate preparation of a polymer dispersion as defined for b) on the base of monomeric composition b) comprising b1) and optionally b2) as defined above:

ii) separate preparation of a dispersion a) of grafted rubber polymer as defined above iii) mixing the dispersion of step i) with the dispersion of step ii) in the proportions so that the weight content of rubber polymer a) without the weight of grafted monomers ranges from 5 to 45%, preferably from 10 to 35% with respect to the total polymer weight of a)+b).

More particularly, the said initiator system is selected from redox initiator systems, in particular composed of an organic peroxide including hydroperoxides, in particular hydroperoxide and a reducing agent acting as a decomposition activator of said peroxide or azo initiators.

Azo initiators decompose thermally without the need of a reducing agent; peroxides and particularly hydroperoxides combined with a reducing agent enable the decomposition of said peroxide or hydroperoxide at low temperatures thus avoiding the generation of acidic degradation by-products obtained at higher temperature decompositions without a reducing agent.

The initiators suitable, according to the process of the present invention, prevent the generation of acid substances, during their decomposition. Suitable organic peroxides or hydroperoxides for use with a reducing agent in the initiator system of the process as defined above may be selected from: benzoylperoxide, cumene hydroperoxide, di tert-butylperoxide, tert-butylhydroperoxide, hydrogen peroxide.

Redox initiator couples between the previously cited organic peroxides or hydroperoxides initiators combined with reducing agents are preferably used, more preferably are used couples composed by hydrogen peroxide and tert-butylhydroperoxide with as reducing agent sulfinic acid derivatives like Bruggolite® FF6. These initiator systems are advantageous in that they enable low temperature initiation and limit the risk of damaging the rubber polymer, in particular the natural rubber.

Suitable azo-initiators may be for example azobisisobutyronitrile (AIBN), 2,2'-azo di(2-methyl butyronitrile) (AMBN).

All the initiators, initiators couples that during the decomposition form acidic substances, like persulphate salts must be rigorously avoided.

Preferably, the amount of initiators used in the present invention are 0.05-2%, more preferably 0.1-0.6% by weight of the total monomers.

The temperatures of the emulsion polymerization process of the present invention, in particular during the 3 steps i), ii) and iii) as defined above, are from 40 to 80° C., more preferably from 40 to 60° C., this in order to run the emulsion polymerization at lower temperatures and in order to reduce the crosslinking reaction of said unsaturated rubber polymer, in particular the crosslinking reaction of natural rubber.

According to this process, the natural or synthetic rubber latex is fed into the reactor according to step iii), at constant rate, during the feed of the monomers pre-emulsion as defined according to monomeric composition b) from the start or preferably after having fed and polymerized at least half of the total amount of monomers. More particularly, from 50 to 75% w/w of the monomeric composition b) is fed as a pre-emulsion and polymerized before adding the said rubber latex in step iii). This process is done with the aim of reducing and controlling the amount of crosslinking of natural or synthetic rubber, caused by the direct reaction of the initiators onto them (on unsaturation of rubber polymer), but instead letting the monomers react with the natural or synthetic rubber latex.

Before starting the feed of the natural or synthetic rubber in step iii), it is fed at constant rate into the reactor a solution of a basic agent, in particular alkaline agent, during step ii), in order to adjust the pH value of at least 7.0, preferably of at least 8.0 and eventually the basic agent is fed continuously into the reactor, even during the feed of the natural or synthetic rubber latex and up the end of step iii).

A conventional surfactant or a combination of surfactants may be used as a stabilizer in the emulsion polymerization of the invention. Generally, the surfactant is at least one selected from the group consisting of anionic surfactants and/or non-ionic surfactants. Examples of preferred surfactants include, but are not limited to, alkali or ammonium salts of alkyl sulfate, alkyl aryl sulphate, alkyl ether sulphate, alkylsulfonic acid, fatty acid which may be an ethoxylated fatty acid, $C_{10}$-$C_{18}$ ethoxylated alcohol sulfosuccinates and derivatives or any combination thereof. A list of suitable surfactants is available in the book "Surfactants and Polymers in Aqueous solutions" (Holmberg et al., 2002, John Wiley & Sons). Polymerizable surfactants may be also used, for example, Hitenol® BC-10, Hitenol® HS 20 and Hitenol® HS 10, available from Asahy Denka.

In general, the rubber portion of the hybrid latex polymer may represent from 5 to 45% by weight and preferably from 10 to 35% by weight of the total solids of the latex a)+b). As the complement to 100%, the portion of polymer generated by the total weight of monomeric composition b) in the said hybrid latex represents from 55 to 95% by weight, preferably from 65 to 90% by weight of the total solids of the latex a)+b).

A third subject of the present invention relates to an applicative composition (formulation) comprising at least one aqueous polymer dispersion as defined above according to the present invention. This composition is in particular an adhesive composition comprising at least one aqueous dispersion as defined above or as obtained by a process as defined above according to the present invention. More particularly, it is a pressure sensitive adhesive (PSA) composition.

According to a particular option, said adhesive composition is a two component composition with said aqueous dispersion being defined with said monomeric composition b) comprising a comonomer b2) bearing hydroxy or carboxy functional groups and the said composition further comprising a crosslinking agent selected from polyisocyanates for a comonomer b2) bearing hydroxyl groups or from polyaziridines for a comonomer b2) bearing carboxy group.

Another subject of the present invention relates to the use of an aqueous dispersion as defined above according to the present invention or as obtained by a process as defined above according to the present invention, in adhesive compositions, in particular for pressure sensitive adhesives (PSA). In particular, this use is for pressure sensitive adhesives (PSA). More particularly, such a use relates to pressure sensitive adhesives (PSA) for labelling, packaging, assembling, construction and medical applications and more preferably said adhesive is applied in the form of an adhesive tape, an adhesive plastic film, an adhesive label, an adhesive spray or any other adhesive coating (in particular applied with a coater). More particularly, according to the use of the aqueous dispersion according to the present invention, said adhesive is applied on a substrate selected from: paper, cardboard, wood including plywood and particleboard, metal, in particular aluminium, glass, plastic including plastic film, composite, textile, fibber, woven and non-woven fabric.

According to a particular use of the aqueous dispersion of the present invention, said use relates to the use of an aqueous dispersion as defined above, in a two components crosslinkable adhesive composition with presence of said monomer b2) in said monomeric composition b) and with b2) bearing hydroxyl or carboxy functional groups, more particularly said use being for removable and repositionable PSA adhesives.

Finally, the invention covers as final product an adhesive, in particular pressure sensitive adhesive, more particularly a pressure sensitive adhesive in the form of a tape or of an adhesive plastic film or of a label, sticker, decals or ribbon of paper or of plastic or in the form of an adhesive spray or in the form of an adhesive cartridge, which adhesive results from the use of at least one aqueous dispersion as defined above according to the present invention or as obtained by a process as defined above according to present invention or as obtained from the use of at least one adhesive composition as defined above and according to the present invention. More particularly, the said adhesive is applied on a substrate selected from: paper, cardboard, wood including plywood and particleboard, metal, in particular aluminium, glass, plastic including plastic film, composite, textile, fibber, woven and non-woven fabric.

This adhesive composition provides a PSA with good adhesion to polar and non-polar surfaces, while maintaining the typical soft touch characteristic of the natural rubber based adhesives and its typical Tg lower than −60° C. The pressure sensitive adhesives formed with the aqueous polymer dispersion composition of the present invention show a further characteristic of having high cohesive strength, avoiding any transfer of residual traces of the adhesive on the substrates where the adhesives, ribbons or labels produced by the PSA of the present invention, are applied.

The aqueous polymer dispersion composition of the present invention can be applied directly as such on the targeted substrates or as a two component 2 k crosslinkable composition comprising a crosslinking agent such as a polyisocyanate or zinc oxide when the monomeric composition b) comprises a functional monomer b2) as defined above, bearing hydroxyl groups or polyaziridines and zinc oxide if b2) bear carboxy groups.

The following examples are presented for illustrating the present invention and its performances and they should not be considered in any way as limiting the covering of the said invention, only defined by the claims below.

EXPERIMENTAL PART

Example 1 (Comparative)

Production of an Aqueous Polymer Dispersion, without any Rubber Latex (0% of Rubber).

866 g of deionized water are added to a glass reactor fitted with a condenser, a stirrer, a temperature control system and inlets for nitrogen, the initiator solutions and the pre-emulsion feed, respectively. A monomer pre-emulsion composed of 981 g of deionized water, 47 g of Rhodocal® DSB, 35 g of Disponil® FES 993, 32.6 g of sodium acetate tri-hydrate, 3887 g of 2-ethyl hexyl acrylate, 168 g of methyl methacrylate, 63 g of acrylic acid and 139 g of hydroxyl ethylacrylate is prepared in another container fitted with a stirrer (pre-emulsifier). When the contents of the reactor have reached a temperature of 50° C., 8 g of 13% tert-butylhydroperoxide solution, 19 mg of ferrous sulphate dissolved in 2 g of deionized water and 23.6 g of 6% Bruggolite® FF6 solution are added into the reactor. About one minute after the addition of initiators, the portion of the monomer pre-emulsion and 101 g of tert-butylhydroperoxide and 206 g of a 6% solution of Bruggolite® FF6 in deionized water are fed into the reactor at a constant feed rate, over a period of 4 hours, taking care to keep the contents of the reactor at a temperature of 60° C. throughout the introduction. After 105 minutes since the start of the monomer pre-emulsion feeding, over a period of 45 minutes, 226 g of 10% sodium hydroxide solution are fed into the reactor. Then, the reaction medium is maintained at 60° C. for a further 15 minutes and 69 g of 13% tert-butylhydroperoxide solution and 183 g of a 6% Bruggolite® FF6 solution are fed separately into the reactor at 60° C. over a period of 100 minutes at constant rate. Half an hour after the end of the above addition, the product obtained is cooled to 35° C. At the end, the mixture is filtered through a screen of 36 mesh. The pH is adjusted with ammonia between 9.0 and 9.5. The dispersion obtained has a pH of 9.4, a viscosity (Brookfield RVT at 20 rpm and at 23° C.) of 450 mPa·s, a dry residue (solids content) of 59.1% by weight (1 h at 105° C.) and a pre-coagulate content on a screen of 275 mesh of about 580 ppm.

Example 2 (Comparative with Physical Mixture with 20.6% of Natural Rubber)

At 160 g of polymer dispersion of the example 1, are added 40 g of a natural rubber latex (Thay low ammonia grade) with 61.5% solids, viscosity 80 mPa·s at 20 rpm and pH=9.9.

The mixture here obtained has a pH of 9.5, a viscosity (Brookfield RVT at 20 rpm and at 23° C.) of 3800 mPa·s, a dry residue of 60.1% by weight (1 h at 105° C.) and a pre-coagulate content on a screen of 275 mesh of about 440 ppm.

Example 3 (Comparative Physical Mixture with 30.8% of Natural Rubber)

At 140 g of polymer dispersion of the example 1, are added 60 g of a natural rubber latex, at pH 9.9 and 61.6% of solids. The mixture here obtained has a pH of 9.7, a viscosity (Brookfield RVT at 20 rpm and at 23° C.) of 3300 mPa·s, a dry residue of 60.1% by weight (1 h at 105° C.) and a pre-coagulate content on a screen of 275 mesh of 481 ppm.

Example 4 (Comparative Physical Mixture with 50% of Natural Rubber)

At 100 g of polymer dispersion of the example 1, are added 100 g of a natural rubber latex, at pH 9.9 and 61.6% of solids.

The mixture here obtained has a pH of 9.8, a viscosity (Brookfield RVT at 20 rpm and at 23° C.) of 1780 mPa·s, a dry residue of 60.6% by weight (1 h at 105° C.) and a pre-coagulate content on a screen of 275 mesh of about 835 ppm.

Example 5 (Invention with Hybrid Polymer with 20% of Natural Rubber on Solids)

866 g of deionized water are added to a glass reactor fitted with a condenser, a stirrer, a temperature control system and inlets for nitrogen, the initiator solutions and the pre-emulsion feed, respectively. A monomer pre-emulsion composed of 981 g of deionized water, 47 g of Rhodocal® DSB, 35 g of Disponil® FES 993, 32.6 g of sodium acetate tri-hydrate, 3887 g of 2-ethyl hexyl acrylate, 168 g of methyl methacrylate, 63 g of acrylic acid and 139 g of hydroxyl ethylacrylate is prepared in another container fitted with a stirrer (pre-emulsifier). When the contents of the reactor have reached a temperature of 50° C., 8 g of 13% tert-butylhydroperoxide solution, 19 mg of ferrous sulphate dissolved in 2 g of deionized water and 23.6 g of 6% Bruggolite® FF6 solution are added into the reactor. About one minute after having added the initiators, the portion of the monomer pre-emulsion and 101 g of tert-butylhydroperoxide and 206 g of a 6% solution of Bruggolite® FF6 in deionized water are fed into the reactor at a constant feed rate, over a period of 4 hours, taking care to keep the contents of the reactor at a temperature of 60° C. throughout the introduction. After 105 minutes since the start of the monomer pre-emulsion feed, over a period of 45 minutes, 226 g of 10% sodium hydroxide solution are fed into the reactor. When the feed of the sodium hydroxide is ended, 1750 g of natural rubber latex is fed at constant rate over a period of 90 minutes. After 240 minutes since the start of the monomer pre-emulsion feed, all the feeds are ended, then the reaction mass is maintained at 60° C. for a further 15 minutes and 69 g of 13% tert-butyl hydroperoxide solution and 183 g of a 6% Bruggolite® FF6 solution are fed separately into the reactor at 60° C. over a period of 100 minutes at constant rate. Half an hour after the end of the above addition, the product obtained is cooled to 35° C. At the end, the mixture is filtered through a screen of 36 mesh. The dispersion obtained has a pH of 8.7, a viscosity (Brookfield RVT at 20 rpm and at 23° C.) of 392 mPa·s, a dry residue of 59.6% by weight (1 h at 105° C.) and a pre-coagulate content on a screen of 275 mesh of about 190 ppm.

Example 6 (Invention, Hybrid Polymer with 20% of Natural Rubber on Solids, but with Different Grafting Ratio)

We proceed as in the above disclosed example 5, with the same reactants amounts and global duration of the monomer pre-emulsion feeding at a constant rate over 240 minutes, but the feeding of the NaOH solution start after 150 minutes from the beginning, with a constant rate and a duration of 45 minutes, then start the feed of the same amount of natural rubber of example 5 into the reactor, at constant rate, over the last 45 minutes of the monomer pre-emulsion feed. The dispersion obtained has a pH of 9.3, a viscosity (Brookfield RVT at 20 rpm and at 23° C.) of 600 mPa·s, a dry residue of 58.1% by weight (1 h at 105° C.) and a pre-coagulate content on a screen of 275 mesh of about 250 ppm.

Example 7 (Invention, Hybrid Polymer with 30% of Natural Rubber on Solids)

We proceed as in above disclosed example 5 but with we feed 2990 g of natural rubber instead of the 1750 g of the example 5. The dispersion obtained has a pH of 9.8, a viscosity (Brookfield RVT at 20 rpm and at 23° C.) of 120 mPa·s, a dry residue of 56.6% by weight (1 h at 105° C.) and a pre-coagulate content on a screen of 275 mesh of about 300 ppm. The polymer dispersion of all the examples were further characterized for their particle size by using a dynamic light scattering coulter N4 plus. From the latex of the previous examples were casted polymer films and on them was determined their glass transition temperatures (Tg) by DSC with a heating rate of 20° C./min. The Tg corresponds to the temperature of the midpoint of the DSC curve, at the third passage (at same heating rate).

The summary of the characteristics of the polymer dispersions of the examples are reported in Table 1a.

TABLE 1a characteristics of the polymer dispersions of the examples

| Example | % NR | pH | Brookfield viscosity at 20 rpm (mPa · s) | Solids (%) | dry coagulum 275 mesh (ppm) | Tg (° C.) | particle size (nm) |
|---|---|---|---|---|---|---|---|
| Natural rubber | | 9.9 | <200 | 61.9 | 150 | −62 | 157 ± 25 (16%) 568 ± 108 (84%) |
| Ex 1 (comparative) | 0 | 9.4 | 450 | 59.1 | 300 | −54 | 422 ± 190 |
| Ex 2 (comparative) | 20 | 9.5 | 3800 | 60.1 | 440 | −53/−62 | 257 ± 21 (28%) 589 ± 43 (72%) |
| Ex 3 (comparative) | 30 | 9.7 | 3300 | 60.1 | 481 | −53/−62 | 359 ± 44 |
| Ex 4 (comparative) | 50 | 9.8 | 1780 | 60.6 | 835 | −51/−62 | 457 ± 105 |
| Ex 5 (invention) | 20 | 8.7 | 392 | 59.6 | 190 | −58 | 381 ± 62 |
| Ex 6 (invention) | 20 | 9.3 | 600 | 58.1 | 250 | −53/−62 | 374 ± 62 |
| Ex 7 (invention) | 30 | 9.8 | 120 | 56.6 | 300 | −60 | 530 ± 129 |

As it is possible to observe from the Table 1a, all the examples of the present invention show significantly lower viscosities at the same solid content (and same rubber content) than the comparative examples produced by mixing the natural rubber with the acrylic dispersion.

Moreover, the example 5 shows an amount of dry coagulum lower than any comparative example, meaning that the natural rubber in the process of the present invention does not produce any amount of dry coagulum.

As observed from the Tg of the polymer films, all polymers of comparative examples produced by mixing the natural rubber with the acrylic dispersion of Example 1 show double Tg corresponding to the two mixed components, meaning that there are 2 separate phases in the polymer film. This observation is contrary to the one from the Tgs of polymers of the examples of the present invention (5, 7), which show a unique Tg, which means a strong inter-diffusion between the two different polymer phases which thus become compatible.

Among the examples of the invention, only in example 6 when the NR is fed just 45 minutes before the end of the monomer pre-emulsion, it is possible to recognize the two separate Tg, due to a lower amounts of NR grafting. These lower Tg for the adhesives produced with the waterborne dispersions of the present invention, strongly contribute to have a feeling of soft pull, when the label is peeled off from the substrate.

Table 1 b below shows and demonstrates that the latexes of the present invention are stable for a long time even if their pH is lower than 9.

TABLE 1b

| Example | % NR | pH | Brookfield viscosity at 20 rpm (mPa · s) | Solids (%) | dry coagulum 275 mesh (ppm) | particle size (nm) |
| --- | --- | --- | --- | --- | --- | --- |
| Ex 5 after 30 days at 60° C. | 20 | 8.5 | 685 | 61.7 | 245 | 363 ± 68 |

Example 8: Application and Characterization of the PSA Polymer Dispersions of the Examples 180 Degree Peel Samples of the adhesive either directly coated on Mylar or laminated to Mylar or PP tapes from the release liner were cut in 2.54 cm by about 20 cm test strips. They were rolled down on stainless steel or polypropylene test panels with a 2 kg rubber clad steel roller moving back and forth, ten times, at a rate of about 30 cm/min. After a dwell time of 20 minutes or 24 hours, each test strip was peeled away from the test panel in an Instron Tensile Tester at 180 degrees to the test panel, i.e., folded back on itself and parallel to the surface of the panel, at a rate of about 30 cm/min. The force to remove the adhesive strip from the test panel was measured in Newtons per meter (N/25 mm). Tests were performed in triplicate.

Shear

Strips of tapes produced in the same way that for the peel test were adhered by its adhesive to a SS plate using a 2 kg rubber clad steel roller with a free end of the tape extending beyond the plate and the adhesive contact area being 2.54 cm×2.54 cm. After the plate was placed at an angle of 2 degrees from the vertical and a load is suspended from the free end. For RT shear, a 1.000 g load was used. The time necessary to drop the load down is the shear time.

Loop

The ends of the tapes produced were placed into the grips of the dynamometer instrument to form a loop, with the adhesive side down. The specimens were lowered onto a stainless steel/pp panel at a rate of 300 mm/min and then raised at the same rate as tack property was measured by reading the max force to remove the tape from the ss/pp panel. The reported values are an average of 5 measures.

Softness

The softness of the adhesives is intended as the feeling of a gentle peel or soft pull, without noise and regular speed, when the label is peeled off from the substrate.

This is a typical characteristic of low Tg adhesives like those produced by using natural rubber. The level of softness of the adhesives is reported with a number from 0 to 5, with 5 we have the higher level of softness equivalent to NR based adhesives.

Rolling Ball

A rolling ball device, like those described in the PSTC 6 norm (Standard Method), equipped with a standard stainless steel ball of 11 mm (7/16") in diameter are cleaned on all their surfaces with isopropyl alcohol or acetone. Then, the apparatus is placed aligned on a strip of tape produced in the same way that for the peel test, with the adhesives side up, all placed on a surface perfectly horizontal. Therefore, the ball is placed on the upper side of apparatus the release pin, hence the ball is released and allowed to roll down until stop on the adhesive. Measure the distance from the point where the ball initially contacts the adhesive to where the ball stops.

The 5 measurements average stopping distance in mm is then reported.

Transfer

The measure of the transfer of adhesives traces is done by applying PP tapes, 25 mm wide, produced with the adhesives of the present invention on stainless steel plates and put in an oven a 40° C. for 2 days, with 1 kg weight on them. After this time, in the oven, the adhesives label is quickly pulled out from the ss plate, if trace of adhesives remain on the ss plate we have a transfer. The absence of transfer of the adhesives has a mark of 5, instead the full transfer of the adhesives has a mark of 0.

The applicative properties of the adhesives tapes, produced with the waterborne polymer dispersions of the examples are reported in Table 2 below.

Table 3 presents the results obtained from the waterborne polymer dispersions of the examples crosslinked with 0.5% w/w of polyaziridine applied on PET tapes.

TABLE 2

Applicative properties of the adhesives on PET tapes

| Example | % NR | Peel ss* 20' (N/25 mm) | Peel ss* 24 h (N/25 mm) | Loop ss* (N/25 mm) | Shear ss* (h) | Rolling Ball (mm) | Softness 1-5 |
| --- | --- | --- | --- | --- | --- | --- | --- |
| Ex 1 (comparative) | 0 | 2.3 | 5.1 | 4.4 | 6 | 120 | 2 |
| Ex 2 (comparative) | 20 | 1.2 | 3.8 | 4.0 | 74 | 50 | 2 |
| Ex 4 (comparative) | 50 | 1.0 | 2.8 | 3.2 | 200 | 50 | 2 |

TABLE 2-continued

Applicative properties of the adhesives on PET tapes

| Example | % NR | Peel ss* 20' (N/25 mm) | Peel ss* 24 h (N/25 mm) | Loop ss* (N/25 mm) | Shear ss* (h) | Rolling Ball (mm) | Softness 1-5 |
|---|---|---|---|---|---|---|---|
| Ex 5 (invention) | 20 | 1.5 | 1.8 | 5.6 | 200 | 35 | 4 |
| Ex 6 (invention) | 20 | 2.2 | 4.2 | 4.7 | 130 | 45 | 3 |
| Ex 7 (invention) | 30 | 2.2 | 2.9 | 3.5 | 200 | 35 | 3 |

*ss: on stainless steel

TABLE 3

Applicative properties of the adhesives, obtained from the waterborne polymer dispersion crosslinked with 0.5% of polyaziridine and applied on PP tapes, instead of a PET film

| Example | % NR | Peel ss 20' (N/25 mm) | Peel ss 24 h (N/25 mm) | Loop ss (N/25 mm) | Softness 1-5 | Transfer 1-5 |
|---|---|---|---|---|---|---|
| Ex 1 (comparative) | 0 | 2.1 | 2.8 | 2.9 | 1 | 1 |
| Ex 2 (comparative) | 20 | 1.8 | 2.2 | 3.2 | 2 | 2 |
| Ex 4 (comparative) | 50 | 0.9 | 1.5 | 3.0 | 3 | 3 |
| Ex 5 (invention) | 20 | 0.8 | 1.5 | 3.0 | 5 | 5 |
| Ex 6 (invention) | 20 | 1.2 | 2.2 | 3.2 | 3 | 5 |

As seen from the results of Table 2, the adhesives obtained with mixture of comparative example 2 shows adhesion a little lower than the adhesion obtained with the dispersion of example 6 (respectively 3.8 vs 4.2) with hybrid polymer and NR fed towards the end of the feed, but with a shear and softness much lower in performances than those obtained with example 6.

By mixing natural rubber with the polymer dispersion of example 1 to have an adhesive with a shear similar to that of example 6, we need to increase the content of natural rubber up to 50% (example 4), if not using the technology (technical means) of the present invention by producing the hybrid polymer of said aqueous dispersion of the present invention. According to the advantageous solution of the present invention, it needs just only to feed 20% of natural rubber (example 5) during the last step of the emulsion polymerization to obtain the same properties than a mixture with 50% NR. Moreover, all hybrid polymers according to the present invention show (see example 5) a higher degree of softness even if using a lower amount of NR. The adhesives of the present invention when crosslinked with polyaziridine to have removable tape on PET show an improved level of crosslinking, testified by lower peel adhesion when compared with examples 1, 2 and 4, but keeping higher level of softness. Even the transfer resistance is higher for inventive examples 5 and 6 (see Table 3, waterborne polymer dispersions crosslinked with 0.5% of polyaziridine).

The invention claimed is:

1. An aqueous hybrid polymer dispersion comprising a mixture of two aqueous polymer dispersions (a) and (b) which are different from each other, aqueous polymer dispersion (a) comprising grafted rubber polymeric particles (a) and aqueous polymer dispersion (b) comprising ungrafted polymeric particles (b):
   a) an aqueous polymer dispersion comprising grafted rubber polymeric particles from rubber polymer selected from the group consisting of (i) natural rubber and (ii) synthetic rubber selected from the group consisting of: polyisoprene, polybutadiene and their copolymers isoprene-butadiene and from other copolymers of isoprene and of butadiene,
   b) an aqueous polymer dispersion with polymeric particles of a second polymer comprising monomeric units derived from a monomeric composition b) comprising:
      b1) a (meth)acrylate of a linear or branched alcohol in $C_4$ to $C_{10}$ or a mixture of such (meth)acrylates, said (meth)acrylate having $Tg_{b1}$ lower than −30° C., and
      b2) optionally, at least one comonomer having $Tg_{b2}$ higher than −30° C.,
   with said grafted rubber polymeric particles being grafted in an aqueous dispersion by a part of said monomeric composition b) as defined above and with said grafted part of monomeric composition b) on said rubber polymer a) representing from 25 to 50% w/w of the total weight of said monomeric composition b) involved in both grafted polymer particles a) and in ungrafted polymer particles b) and wherein a weight proportion of said rubber polymer a), without grafted monomers, with respect to the global weight of a)+b), represents from 10 to 35%.

2. The dispersions according to claim 1, wherein said rubber polymer a) is natural rubber.

3. The dispersion according to claim 1 wherein b1) is selected from the group consisting of: butyl (meth)acrylate, 2-ethyl hexyl (meth)acrylate, 2-octyl (meth)acrylate, isooctyl (meth)acrylate, nonyl(meth)acrylate, decyl (meth)acrylate, and a mixture of at least two or of at least three of said monomers b1) as above-defined.

4. The dispersion according to claim 1 wherein said polymer b) comprises monomeric units derived from a comonomer b2) selected from the group consisting of: functional and non-functional ethylenically unsaturated monomers, with said functional monomers being selected from the group consisting of monomers bearing at least one carboxy ($-CO_2H$), hydroxyl ($-OH$), acetoacetoxy, amine or nitrile ($-CN$) functional group, and with said non-functional monomers being selected from the group consisting of $C_1$ to $C_6$ esters of (meth)acrylic acid, vinyl aromatic monomers, and esters of vinyl alcohol with $C_2$ to $C_{18}$ carboxylic acids.

5. The dispersion according to claim 4, wherein a weight content of b2) in said polymer b) varies from 0 to 30%.

6. The dispersion according to claim 1 wherein said polymer b) is a homopolymer of 2-ethyl hexyl acrylate.

7. The dispersion according to claim 4 wherein said monomeric composition b) comprises 2-ethyl hexyl acrylate as monomer b1) and a comonomer b2) selected from the group consisting of at least one functional and non functional monomer as defined in claim 4, with a weight content of 2-ethyl hexyl acrylate as monomer b1) with respect to said monomeric composition b) varying from 70 to 99.9%, of said monomeric composition b) and said polymer b) is a copolymer of 2-ethyl hexyl acrylate as monomer b1) with a comonomer b2) selected from the group consisting of: at least one functional and non functional monomer as defined in claim 6, with a weight content of 2-ethyl hexyl acrylate as monomer b1) with respect to said polymer b) varying from 70 to 99.9%.

8. The dispersion according to claim 1 wherein said comonomer b2) is present and is a functional monomer selected from the group consisting of a monomer bearing at least one carboxy group, and a monomer bearing at least one hydroxyl group, and a combination thereof.

9. A process of preparing an aqueous polymer dispersion as defined in claim 1 comprising the following successive steps:
  i) preparing an aqueous dispersion of a polymer b) by emulsion polymerization with continuous constant rate feeding in a reactor of a pre-emulsion of monomers b) comprising b1) and optionally b2), as defined in claim 1
  ii) before step iii) as defined below and during said continuous feeding of said pre-emulsion, adjusting pH of the reactor at a value higher than 7, by the feeding at a constant feeding rate of an aqueous solution of a basic agent, optionally with said feeding continuing up to the end of the following step iii) or by adding in a shot, an aqueous solution of said basic agent and
  iii) when the quantity in the reactor of the said continuously fed pre-emulsion of monomers b) represents a prefixed value being from 50 to 85%, w/w of said pre-emulsion, then starting a progressive addition at constant feeding rate of an aqueous dispersion of rubber polymer a) as defined according to claim 1 with maintenance of the said continuous feeding at constant rate of the remaining pre-emulsion of monomers b), with a resulting chemical modification of said rubber polymer a) by the grafting reaction of said monomers b) on it,
  with the said emulsion polymerization and grafting reactions being conducted in the presence of an initiator which does not generate acidic decomposition products.

10. The process according to claim 9, wherein said initiator is selected from redox initiator systems composed of an organic peroxide including hydroperoxides, and a reducing agent acting as a decomposition activator of said peroxide or from azo initiators.

11. An adhesive composition comprising at least one aqueous dispersions defined according to claim 1.

12. The adhesive composition according to claim 11 which is a pressure sensitive adhesive (PSA) composition.

13. The adhesive composition according to claim 11 which is a two component composition, said composition further comprising a crosslinking agent selected from the group consisting of polyisocyanates for a comonomer b2) bearing hydroxyl groups and from polyaziridines if the comonomer b2) bears carboxy group.

14. The adhesive composition according to claim 12 wherein said adhesive is applied in the form of a tape, a plastic film, a label, a spray or a coating.

15. The adhesive composition according to claim 11 which is applied on a substrate selected from the group consisting of: paper, cardboard, wood including plywood and particleboard, metal, glass, plastic, composite, textile, fiber, woven and non-woven fabric.

16. The aqueous dispersion of claim 1, wherein $Tg_{b1}$ is lower than $-40°$ C. and $Tg_{b2}$ is higher than $-10°$ C.

17. The aqueous dispersion of claim 3, wherein said monomer b1) is selected from the group consisting of n-butyl acrylate, 2-ethyl hexyl acrylate, 2-octyl acrylate or isooctyl acrylate, nonyl(meth)acrylate and decyl (meth)acrylate.

18. The aqueous dispersion of claim 3, wherein said monomer b1) is selected from 2-ethyl hexyl acrylate.

19. The aqueous dispersion of claim 7, wherein said comonomer b2) is at least one functional monomer bearing at least one carboxy ($-CO_2H$) or hydroxyl ($-OH$) functional group.

20. The aqueous dispersion of claim 7, wherein the said weight content of 2-ethyl hexyl acrylate as monomer b1) with respect to said polymer b) varies from 80 to 98.5%.

* * * * *